Nov. 1, 1949.  T. O. SUMMERS, JR  2,486,578
GYRO VERTICAL

Original Filed Feb. 28, 1939  4 Sheets-Sheet 1

THOMAS O. SUMMERS JR.,
INVENTOR.

BY
ATTORNEY.

Nov. 1, 1949. T. O. SUMMERS, JR 2,486,578
GYRO VERTICAL
Original Filed Feb. 28, 1939 4 Sheets-Sheet 2

THOMAS O. SUMMERS JR.,
INVENTOR.

BY
ATTORNEY.

Nov. 1, 1949.  T. O. SUMMERS, JR  2,486,578
GYRO VERTICAL
Original Filed Feb. 28, 1939  4 Sheets-Sheet 3

THOMAS O. SUMMERS JR.,
INVENTOR.

BY
ATTORNEY.

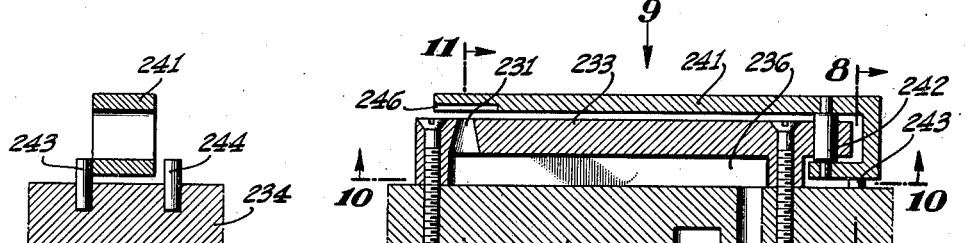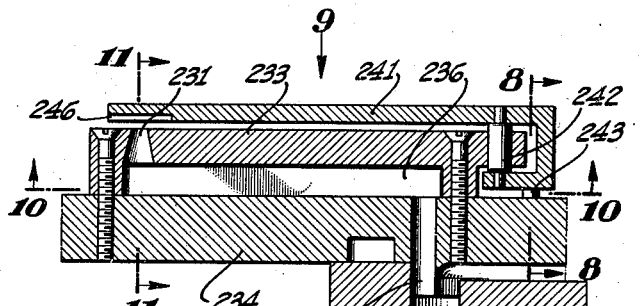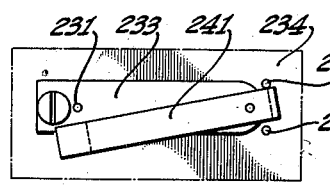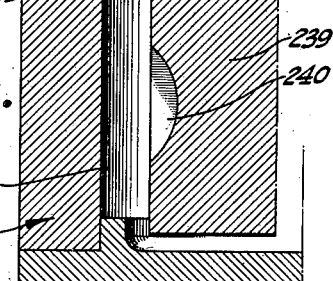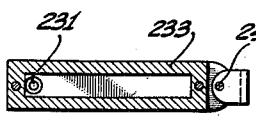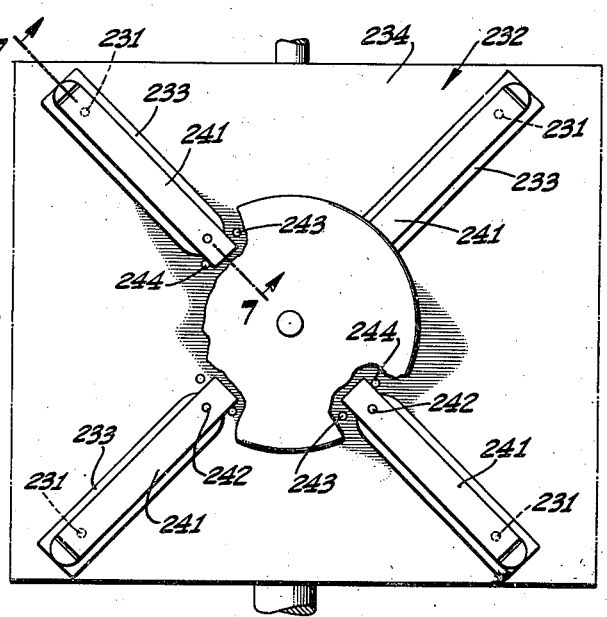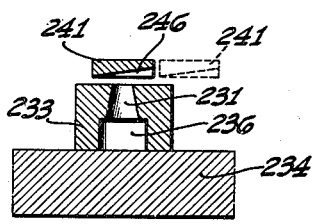

Patented Nov. 1, 1949

2,486,578

UNITED STATES PATENT OFFICE 2,486,578

GYRO VERTICAL

Thomas O. Summers, Jr., Los Angeles, Calif.

Original application February 28, 1939, Serial No. 258,931. Divided and this application November 11, 1942, Serial No. 465,241

1 Claim. (Cl. 74—5.43)

This invention relates to navigation instruments, and more particularly to an instrument adapted to maintain a substantially fixed attitude with respect to the earth's surface.

An object of the present invention is to provide an improved and highly efficient form of gyro vertical, i. e., a mechanism for insuring great accuracy in disposing the apparatus with which it is associated at the proper attitude with respect to the earth's surface which is necessary for its efficient, dependable, and accurate operation.

A further object is to provide a gyro vertical construction which operates by employing the reactive forces of pneumatic jets to apply a torque to the universally supported gyroscope of an instrument of the general character indicated, that torque being applied to the gyroscope in such a manner and such a direction that it causes the gyroscope to precess to the desired attitude, wherein the jet-controlling devices are not suspended for free pendulosity in planes parallel to the axis of the rotor's spin as in case of more conventionally constructed devices, but instead are mounted for reciprocatory movement along a plane to which the axis of spin is perpendicular.

In order to gain an understanding of the importance of this feature of the present invention, a brief statement of the state of the prior art will be helpful. Prior development of this class of mechanism is best exemplified by the gyro vertical forming the subject matter of Patent No. 1,982,636 issued to Carlson on December 4, 1934. In this type of gyro vertical several small pendulous controllers are pivoted to the universally supported housing of an air-driven gyroscope and whenever the gyroscope as a whole is in the vertical each controller covers one of a corresponding number of air outlets suitably arranged in the housing. Whenever the housing becomes inclined, at least one of the air outlets becomes uncovered because it moves out from behind its associated pendulous controller which is retained by gravity in its vertical position while the tilting movement of the housing in which the outlet is formed is in progress. As the result of this uncovering of the air outlet, egress of air therethrough is permitted in the form of a jet, the reactive force of which is exerted as an erecting torque upon the gyroscope. An inherent disadvantage of this type of gyro vertical erecting device, however, lies in the fact that after the gyroscope approaches the vertical, that outlet is gradually reduced in size until such time when the spinning axis of the gyroscope is only slightly displaced from true vertical; and it has been found practically impossible to arrange the outlets and their pendulous controllers so that sufficient erecting torque to complete movement of the gyroscope to the truly vertical position is developed when an outlet is only slightly open because for a small displacement of the gyroscope the relative movement between a pendulous controller and its associated outlet is too slight to cause any appreciable uncovering of the outlet. By the present invention I propose to replace the conventional pendulous type of control in a gyroscope erecting mechanism by what is actually a non-pendulous type, and thereby to provide an improved gyro vertical construction in which the slightest tilt causes a controller to move completely away from in front of its associated outlet and completely back again after return of the gyroscope to the vertical, and thereby eliminate the possibility of permitting the controller to come to rest in any intermediate position.

A further object in this connection is to provide a gyroscope-erecting mechanism which relies for its operation upon variation in the reactive forces of jets of air issuing from the rotor housing and yet which avoids variation in the quantity of air passing through the housing and the consequent variation in the speed in the rotor's spinning, which has been one of the objectionable features in the earlier devices of this type.

The present application is a division of my co-pending application, Serial No. 258,931, filed February 28, 1939, issued April 18, 1944 as Patent No. 2,346,798.

The invention possesses other objects and features of advantage, some of which, with the foregoing, will be set forth in the following description of the preferred forms of my invention illustrated in the drawings accompanying and forming part of the specification. It is to be understood however, that I do not limit myself to the showing made by the said drawings and description as I may adopt variations of the preferred forms within the scope of my invention as set forth in the claims.

Referring to the drawings:

Figure 6 is a top plan view of the inner suspended structure of a slightly modified form of gyro vertical utilizing an alternative type of non-pendulous controller for the erecting mechanism.

Figure 7 is an enlarged view in vertical section on the line 7—7 of Figure 6 with direction of view as indicated.

Figure 8 is a detail view in vertical section taken on the line 8—8 of Figure 7 with the direction of view as indicated.

Figure 9 is a detail view in top plan, the direction of view being indicated by arrow 9 of Figure 7.

Figure 10 is a bottom plan view of the structure illustrated in Figure 9 taken in horizontal section on the line 10—10 of Figure 7 with the direction of view as indicated.

Figure 11 is a detail view in vertical section taken on the line 11—11 of Figure 9 with the direction of view as indicated.

Figure 1:
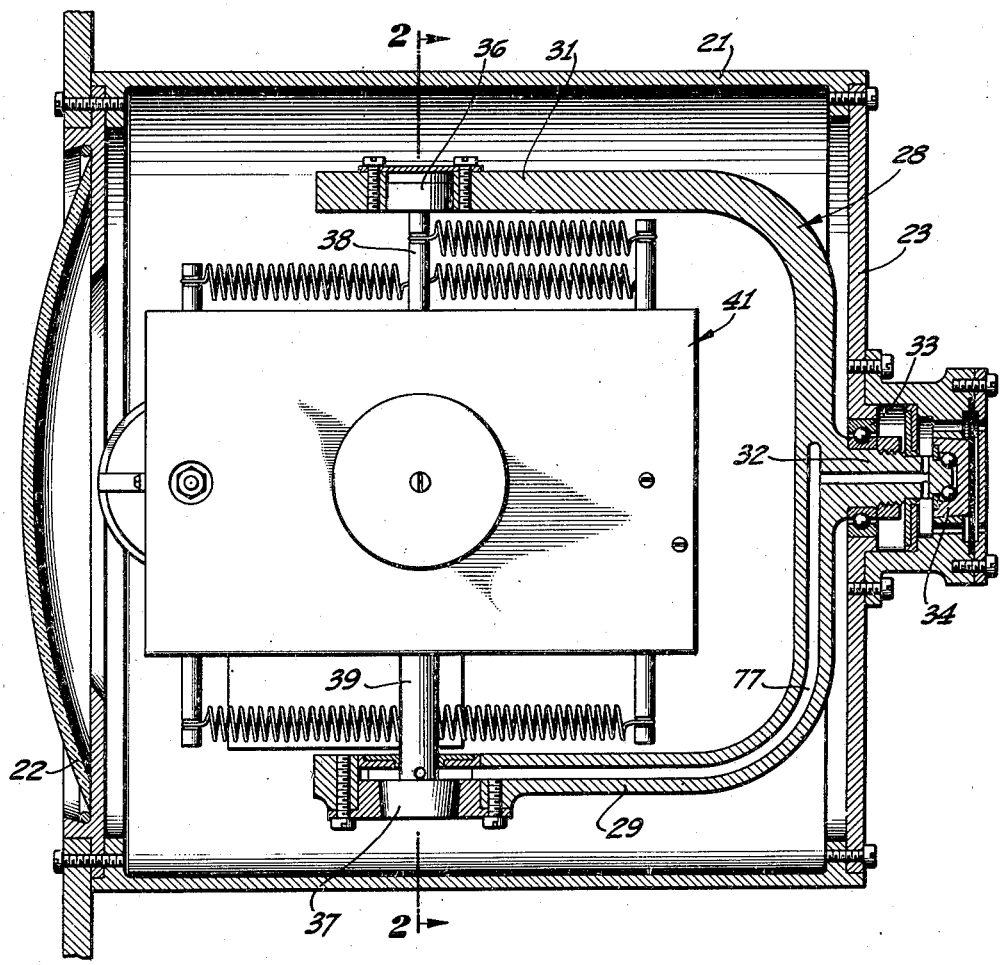
Figure 1 is a longitudinal, horizontal, medial sectional view taken through the housing of the navigation instrument which forms the subject matter of my said co-pending application and of which the gyro vertical of the present application is a constituent part. This figure shows the mechanism within the housing partly in plan view and partly in horizontal section.
Figure 2:
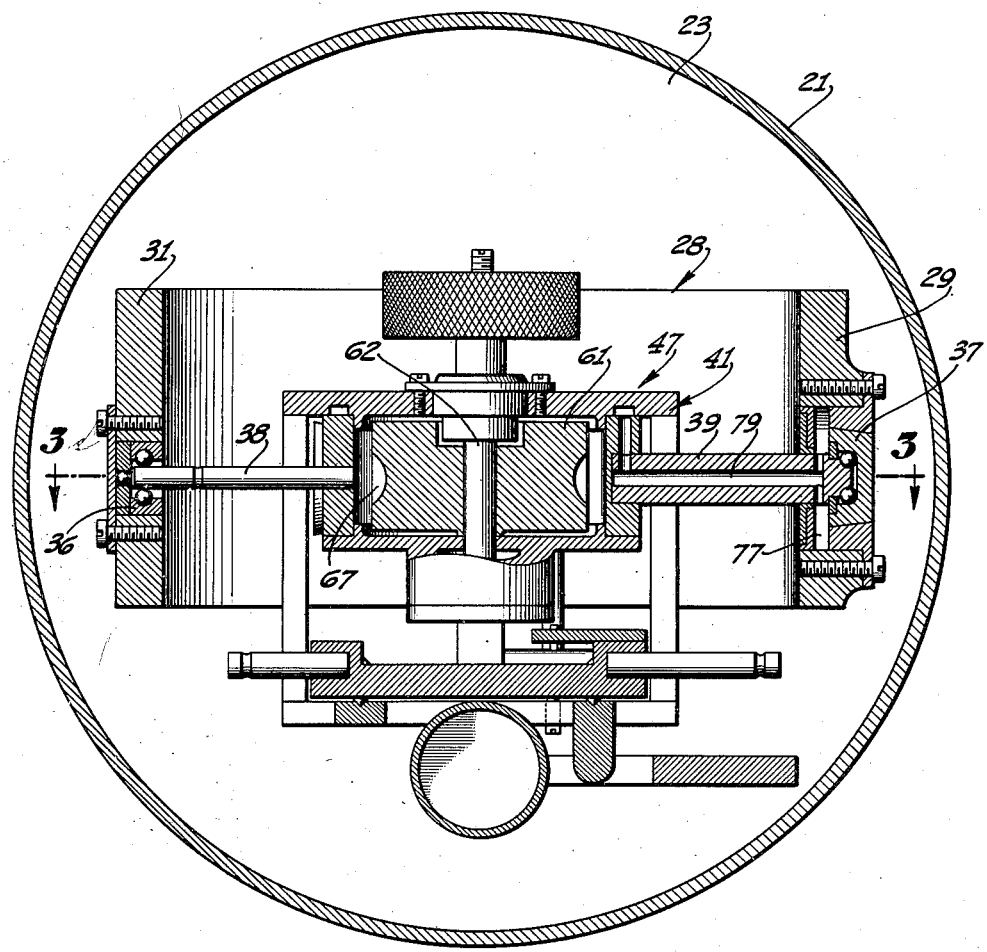
Figure 2 is a transverse, vertical, medial sectional view taken through both the housing and internal mechanism, the plane of section being indicated by the line 2—2 of Figure 1 and the direction of view by the arrows.

Whereas the gyro vertical of the present invention is capable of general application it is shown and described herein as being cooperatively associated with the ground speed indicator which forms the subject matter of my said application of which this is a division. However, inasmuch as the details of construction of the ground speed indicator are not an essential feature of the erecting mechanism of the present application only those portions thereof will be described herein which require explanation in order to gain an understanding of the design and/or operation of the erecting mechanism. Suffice it therefore, for the purpose of the present disclosure, to explain that the navigation instrument, of which the present gyro vertical is illustrated as being a part, comprises a housing 21 closed at one end by a window 22 and at its after end by a plate 23, both of which are so fitted that they establish a substantially airtight seal with the housing 21.

The working mechanism of the instrument is supported within the housing 21 by a suitable gimbal mounting comprising an outer gimbal member 28 including a pair of spaced parallel arms 29 and 31 joined at their after ends by a transverse bar having a trunnion 32 extending aft therefrom for suitable engagement with anti-friction bearings 33 and 34 to support the outer gimbal member 28 for free swinging movement within the housing 21 about a longitudinal axis. The two arms 29 and 31 carry aligned anti-friction bearings 36 and 37 adjacent their outer ends within which are revolubly supported trunnion shafts 38 and 39 extending laterally from the inner casing 41. These shafts 38 and 39 extend at right angles with respect to the axis of the bearings 33 and 34 and accordingly the inner casing 41 is supported by free universal swinging movement within the housing 21.

The inner casing 41 serves as the housing for the gyro vertical construction which is indicated in its entirety at 47 and which comprises a rotor 61 carried by a shaft 62 suitably journaled within the casing 41 for rotation about a normally vertical axis, i. e., an axis normally perpendicular to both the major and minor gimbal axes. Preferably the rotor 61 is air driven and for this purpose instead of supplying air pressure greater than atmospheric, it has been found more desirable to exhaust air from the interior of the airtight housing 21 so as to permit air at atmospheric pressure to enter through suitable nozzles 66 adapted to direct their jets against blades 67 which are formed in the periphery of the rotor 61 in the modification illustrated, the parts are so arranged that the rotor turns in a clockwise direction. Suitable means, including passageways 77 and 79 within the gimbal member 28 and the shaft 39, respectively, are provided for supplying air to the nozzles 66 in such a manner as to prevent the development of a torque upon the gimbal-supported structure, but since the details of this air conduit system form no portion of the present invention, reliance can be placed upon my said co-pending application for its more complete description. Furthermore, means (not shown) are provided for exhausting air from the housing 21 and thereby so decreasing the pressure therein that air at atmospheric pressure will enter the said air conduit system, and be directed by the nozzle 66 against the blades 67 of the rotor 61 in such a manner as to cause the rotor 61 to rotate at suitable speed.

Figure 3:
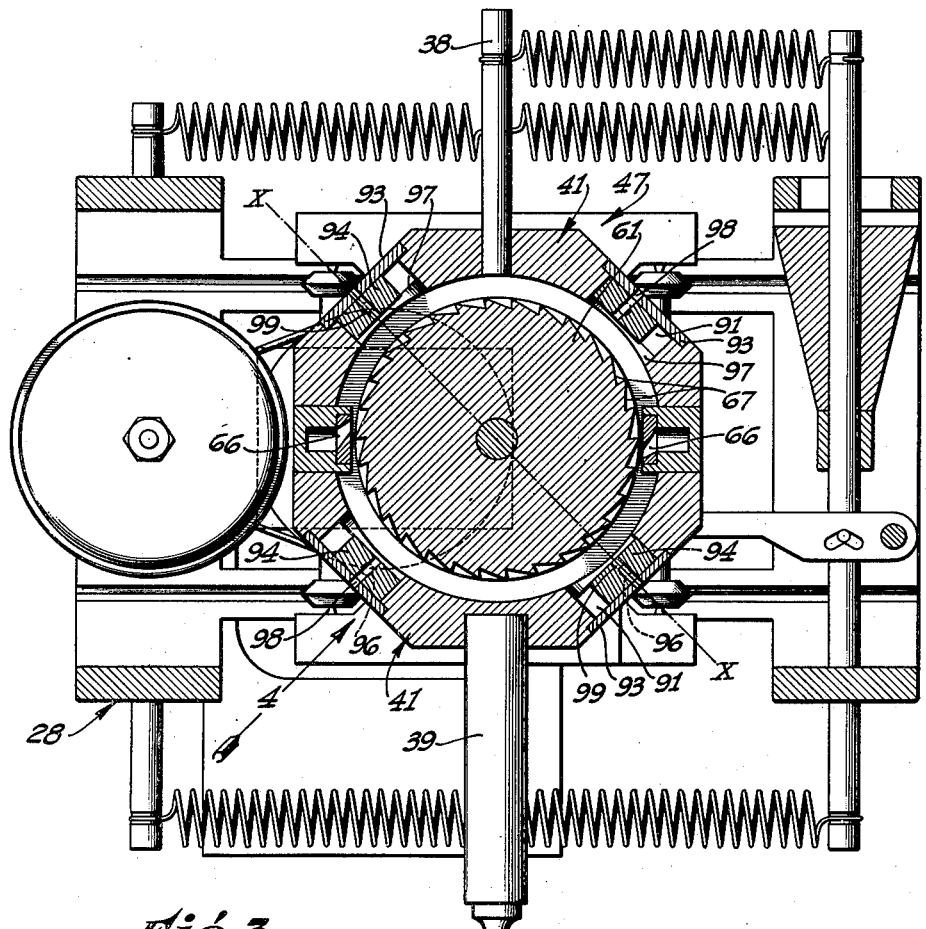
Figure 3 is an enlarged view showing the operating mechanism removed from its housing with the plane of section taken through the gyro vertical portion of the device on the line 3—3 of Figure 2. Other portions of the device, however, are illustrated in top plan.
Figure 4:
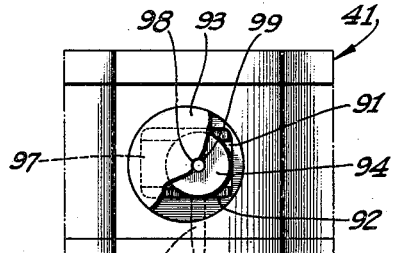
Figure 4 is a detail view in elevation of the rotor housing, taken in the direction of arrow 4 in Figure 3. A portion of the figure is broken away to reveal one of the air outlet valves in its closed position.
Figure 5:
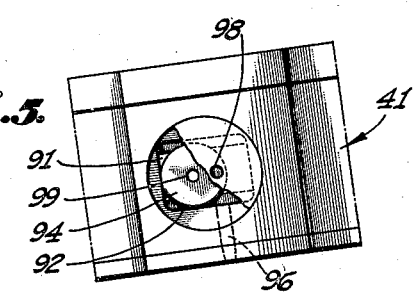
Figure 5 is a view similar to Figure 4 showing the apparatus tilted and the valve moved to its open position.

As best shown in Figure 3, the inner casing 41 has a plurality of recesses 91 formed in its vertical walls and at equally spaced intervals about the axis of rotation of the rotor 61. Preferably there are four of these recesses. By referring to Figures 4 and 5 it will be observed that the bottom 92 of each of the recesses 91 is smooth and disposed in a plane to which the spinning axis of the rotor 61 is perpendicular. Each recess 91 is closed by a plate 93 which serves as a guideway for a cylindrical roller 94 which is disposed within the recess and is adapted to roll back and forth upon the smooth bottom surface thereof. In one extreme of its movement the roller 94 of each recess is disposed in closing relationship to a vertical passageway 96 leading from the interior of the associated recess 91 to the exterior of the inner casing 41. A suitable opening 97 (see Figure 3) is formed in the inner wall of each recess 91 to permit air to flow from the rotor chamber into the recess 91.

Each closing plate 93 also is provided with an outlet orifice 98 extending horizontally and adapted to communicate with an axial passageway 99 in the associated roller 94 when that roller is in that position which results in closing the passageway 96. All of the air exhausted from the rotor chamber passes through the several recesses 91, but the direction in which that air moves from each of the chambers in being discharged from the inner casing 41 to the interior of the housing 21 is determined by the position of the roller 94. When the roller 94 is in the position illustrated in Figure 4 the associated vertical outlet orifice 96 is closed and all of the air discharged through that recess 91 must flow through the associated horizontal orifice 98. This is the position assumed by each of the rollers 94 when the device is in that position wherein the spinning axis of the rotor 61 is accurately vertical. All of the horizontal orifices 98 are so disposed that all of their axes radiate from the point of intersection of the longitudinal and transverse turning axes of the casing 41, with the result that the reactive force exerted against the casing as the result of egress of air through any of the horizontal orifices will have no tendency to move the suspended structure about either of its axes of suspension.

However, if the suspended mechanism is disturbed in such a manner as to move the spinning axis of the rotor 61 to a tilted position, the floor 92 of at least one of the recesses 91 will assume an inclined position, and its associated roller 94 will be rolled by gravity to the opposite end of its stroke, closing the associated horizontal discharge orifice 98 because the axial passageway 99 moves out of registry therewith, and opening the associated vertical orifice 96. Of course when such tilt of the apparatus occurs, at least two of the horizontal floors 92 will be tilted but the rotor 94 of only one of these two will be permitted to roll because of the direction of tilting which causes one roller to move away from its associated vertical orifice, whereas the diametrically opposite roller cannot move downwards in the direction of tilt because when it is in closing relation with its associated vertical orifice 96, it already is in contact with the limiting end wall of the associated chamber 91.

When any one of the vertical orifices becomes uncovered the air no longer can be delivered from the casing 41 through the associated horizontal orifice 98. Instead, it is required to alter its course and escape through associated vertical orifice 96, developing a jet of air, the reactive force of which is exerted against the housing in a vertical direction and at a point removed from the intersection of the housing's axes of suspension. As a result, a turning moment is imposed upon the housing, urging the associated portion of the housing to swing upward about an axis perpendicular to that about which the gyroscope has inclined, use being made of this turning moment to cause the gyroscope to erect itself to a substantially vertical position.

It is a well known gyroscopic characteristic that whenever the spinning axis of a gyroscope is urged to move angularly about an axis perpendicular to its own axis of spin, the gyroscope will endeavor to move as though it were attempting to align, by the most direct route, its said spinning axis with the said axis about which it is urged, and in such direction that were the feat actually accomplished, the direction of spin of the gyro rotor would coincide with the direction of the said urged angular movement. In other words, whenever the spinning axis of a gyroscope is forced to move angularly about a second axis perpendicular to its axis of spin, there results a precessional movement about a third axis perpendicular to the other two. Furthermore, in consequence of this precessional movement about the third axis, the gyroscope endeavors to move about the said second axis but in the opposite direction, with the result that the gyroscope resists movement about the said second axis and the only appreciable movement of the gyroscope in the precessional movement about the said third axis.

To apply this discussion to the present apparatus, consider, for example, that the gyro vertical 47 becomes tilted about a horizontal axis $x-x$ (see Figure 3) and in that direction which causes that position of the inner casing 41 which is in the upper right hand portion of Figure 3 to move downwards and the opposite portion of the casing to move upwards. Then the roller 94 in the lower right hand portion of the Figure will remain stationary because of its abutment against the wall of its recess which moved downward as the tilting took place. However, the roller 94 at the upper left hand corner of the figure will roll by gravity along the inclined bottom surface 92 of its associated recess 91 which has become tilted coincidentally with the tilting movement of the casing. This results in completely uncovering the associated vertical orifice and permits air to flow downwards therethrough, causing the air to be ejected in the form of a jet and as a consequence, a reactive force is developed which is made manifest as an upward push against the casing 41 at the axis of that orifice. It becomes apparent therefore that the escape of air through the vertical orifice results in a turning moment perpendicular to the axis about which the gyro vertical is tilted. The moment thus produced will cause the gyro vertical to move about an axis perpendicular to the axis $x-x$, with the upper left hand portion (Figure 3) of the housing moving upwards. This will cause the gyroscope to precess about the axis $x-x$, urging the portion of the housing appearing in the upper right hand portion of Figure 3 to move upward, inasmuch as the rotor spins clockwise, thus restoring the gyro vertical to the substantially erect position. As this return motion occurs a second precession is set up about the axis perpendicular to the axis $x-x$, wherein that portion of the housing which contains the vertical port 96 which has functioned as above described, is urged downwards in opposition to the moment produced by the expulsion of air, with the result that the only appreciable movement of the gyro vertical is about the axis about which the device became displaced but in the opposite direction.

Upon return of the gyroscope to vertical position, the floor 92 which previously was tilted, will be returned to horizontal leaving the roller 94 free as far as the force of gravity is concerned. Therefore, the very slight force exerted eccentrically against the roller by the air rushing out through the vertical port 96 is ample to cause the roller 94 to return to its Figure 4 position. This results in closing the associated vertical port 96 and in opening the associated horizontal orifice 98 so that air again is expelled in the plane of the gimbal bearings with the result that the reactive forces thus developed horizontally against the casing manifest no tendency to tilt the casing.

An important detail of operation which should be mentioned in connection with the roller valves 94 is that they can not ordinarily assume any intermediate position; i. e., they must move either to fully open position or fully closed position. Herein lies the explanation of the superiority of the erecting mechanism of the present invention as compared with corresponding structures in previously designed gyro verticals. Heretofore, in this type of device, it has been customary to control the flow through the orifices by means of pendulous blades which swing towards and away from their respective orifice-closing positions. Such swinging movement, however, entails a gradual opening and gradual closing of each of the several orifices, i. e., the parts inevitably must, at some period during their operation, assume intermediate positions between fully opened and fully closed. The disadvantage of such an arrangement is that as the gyro vertical moves back towards its accurately erect position, the orifice through which is rushing the air responsible for the erecting movement of the gyroscope, gradually is becoming more and more nearly closed, with the result that just prior to the time at which the spinning axis of the gyroscope again attains its truly vertical position, the orifice is so nearly closed that the reactive force exerted against the housing then has become so small that it no longer has any appreciable effect and accordingly the erecting device is never able to erect the gyro vertical with that degree of exactitude desired for the precise operation of devices of this general character. This disadvantage of prior devices has been overcome completely in the apparatus of the present invention, wherein the erecting orifices remain fully open, discharging air at their full capacity and thus causing the development of maximum torque applied to the casing 41, until no further need for their operation remains, whereupon they become completely closed, with no gradual diminution of torque.

Another disadvantage present in earlier gyro erecting devices relying upon variations in the reactive forces of jets of the air used to impel the rotor, has been that the quantity of air flowing through the housing is altered whenever variation in flow through any of the erecting orifices occurs. In the present apparatus, liability of variation in the quantity of air and consequent variation in the rate of the rotor's spinning are obviated, since the vertical orifices 96 are of approximately the same capacity as the horizontal orifices 98, with the result that whenever any of the orifices closes, another orifice of the same capacity opens and no variation occurs in the quantity of air escaping from the rotor housing.

Figures 6 to 11 inclusive illustrate a modified form of construction of the gyro erecting mechanism of the present invention. As in the previously described modification, each of the orifices 231 through which air is discharged from the rotor housing 232 is disposed vertically. Preferably in order to increase the horizontal distance from the gimbal axes to the vertical axes of the discharge orifices 231, and thereby increase the sensitivity and responsiveness of the apparatus to the reactive forces of the air jets, each of the orifices 231 is formed in the upper face of an extension housing 233 affixed to the top 234 of the rotor housing 232. A passage 236 is formed in the under side of each extension housing 233 and establishes communication between the associated discharge orifice 231 and a port 237 leading through the top 234 into the chamber 238 within which the rotor 239 of the gyroscope is mounted.

As in the previously described modification, the gyroscope rotor 239 is rotated by jets of air impinging against blades 240 on the periphery of the rotor, and therefore the air pressure within the chamber 238 is greater than exteriorly thereof. Consequently as long as the device is in operation there is tendency for air to rush out of all the ports 237 through the horizontal passageway 236 and thence vertically upwards through the discharge orifices 231. It is the reactive forces of the jets of air from the several orifices 231 which is relied upon to cause the erection of the gyroscope as hereinabove mentioned.

Therefore by providing means operated by gravity whenever the gyroscope deviates from its proper vertical position and adapted to regulate flow through the several orifices 231 the gyroscope can be caused automatically to adjust itself quickly and accurately to that position which is requisite for the satisfactory operation of the instrument.

Instead of taking the form of rollers adapted to roll back and forth on horizontal surfaces, as in the previously described modification, the means for regulating flow through each of the discharged orifices 231 comprises a vane or blade 241 pivotally mounted as by a pin 242 adjacent one end of the blade 241. Each blade 241 extends horizontally outwards from its pivot pin 242, i. e., away from the intersection of the gimbal axes, and preferably closely overlying the top of the associated extension housing 233, to a position beyond the associated discharge orifice 231. Since each of the pivot pins 242 is vertical, the plane of movement of each blade is horizontal and therefore perpendicular to the spinning axis of the rotor, in which respect the blades correspond to the roller type of jet controllers previously described. Movement of each of the blades 241 is limited by two stop pins 243 and 244, the former stopping movement of the associated blade in one direction and when the blade is disposed over the associated discharge orifice 231; and the latter stopping movement of the blade in the other direction, but not until the blade has completely uncovered the orifice. Figure 9 illustrates the blade 241 in this orifice-uncovering position and in engagement with the stop pin 244. The parts are so arranged and interassociated that when the gyroscope is displaced from the vertical, carrying with it those parts of the instrument which depend upon it for orientation with respect to the vertical, one or more of the blades 241 will swing out of alignment with the associated orifice or orifices, as the case might be. This will permit a substantial increase in the amount of air flowing through the one or more orifices which have thus become uncovered; and for each orifice uncovered a reactive force will be developed urging the associated position of the housing downwards, i. e. developing a torque urging the housing to rotate about at least one of its gimbal axes. In this manner, precession of the gyroscope is induced and the gyroscope caused to return to the vertical, thereby correcting the deviation therefrom which was responsible for the shifting of the blade or blades 241 from their orifice-closing position.

In this connection it might be explained that the blades 241 do not completely close their respective orifices 231, but move to a position closely overlying them and thus serve to reduce but do not entirely stop flow of air therethrough. The reason for this is that the modification here being described is not especially intended for use in an instrument which would require a constant speed of rotation of the gyroscope's rotor and consequently a constant flow of air through the rotor housing. Instead, the erecting mechanism of this modification is intended for use in connection with an instrument in which constancy of speed of rotation of the rotor is not important, as for example, in an artificial horizon. Therefore, the several orifices 231 may constitute the sole means of egress of air from the rotor chamber 238, which accounts for the spacing of the blades 241 above their respective orifices 231, wherein they do not stop but merely impede flow therethrough. When one or more of the blades 241 moves away from their associated jets, the rate of flow through that orifice then increases with a consequent reduction in a quantity of air escaping through the other orifices.

Preferably means are provided for resisting very small forces tending to displace the blades 241 from jet-stopping position. The reason for this is that otherwise there might be a tendency for the blades to become displaced simply as a result of vibration of the instrument's carrier, or other influences than actual displacement of the instrument from its proper, vertical position. With this end in view, I prefer to form the extreme end of each blade, i. e., that portion thereof against which the associated jet impinges, with an oblique under face 246, which is best shown in Figure 11. The direction of pitch of this oblique face is such that the impingement of the jet thereagainst produces a component force which tends to hold the blade in jet-stopping position over its associated orifice 231. Nevertheless, the slope of the face 246 is so slight that whenever any appreciable tipping of the rotor housing occurs, thereby producing a component of the force of gravity against one or more of the blades 241 urging them away from their associated stop pins 243, the components derived from impingement of the jets against the sloping faces 246 will be less than the forces urging the blades out of their respective jets, with the result the proper functioning of the blades is not interfered with.

I claim:

In a gyro vertical a casing, means supporting said casing for freedom of movement about a plurality of axes, a rotor revolubly mounted within said casing, means for spinning said rotor, said casing having fluid directing orifices offset from said axes whereby fluid directed therefrom will develop reactive forces urging said casing to rotate about said axes, a controller associated with each of said orifices and obstructing flow of fluid therefrom when the axis of spin of said rotor is vertical, said controllers being pivotally mounted on said casing for movement under the influence of gravity, in a plane perpendicular to the axis of spin of said rotor and in response to movement of said casing to and from a position in which the axis of spin of said rotor is vertical, to uncover the associated orifices to provide for unobstructed discharge of fluid therefrom to develop reactive forces to restore such axis of spin to vertical, each of said controllers being formed with reactive surfaces cooperative with fluid discharged from said orifices to restrain movement of said controllers away from such orifice obstructing positions.

THOMAS O. SUMMERS, JR.

REFERENCES CITED

The following references are of record in the file of this patent:

UNITED STATES PATENTS

| Number | Name | Date |
|---|---|---|
| 1,442,799 | Gray | Jan. 23, 1923 |
| 2,036,229 | Moss | Apr. 7, 1936 |
| 2,036,288 | MacFarlane | Apr. 7, 1936 |
| 2,140,191 | Schuchardt et al. | Dec. 13, 1938 |
| 2,159,099 | Moss | May 23, 1939 |
| 2,183,939 | Moss | Dec. 19, 1939 |
| 2,227,529 | Alkan | Jan. 7, 1941 |
| 2,368,058 | Whatley | Jan. 23, 1945 |

FOREIGN PATENTS

| Number | Country | Date |
|---|---|---|
| 95,595 | Sweden | May 2, 1939 |